United States Patent [19]

Puri

[11] 4,239,840
[45] Dec. 16, 1980

[54] PRESSURE CONTACT CONSTRUCTION FOR DRYCELL BATTERIES

[75] Inventor: Ashok K. Puri, Toronto, Canada

[73] Assignee: Union Carbide Canada Limited, Toronto, Canada

[21] Appl. No.: 93,964

[22] Filed: Nov. 14, 1979

Related U.S. Application Data

[63] Continuation-in-part of Ser. No. 902,015, May 1, 1978, abandoned.

[30] Foreign Application Priority Data

Jun. 15, 1977 [CA] Canada .................................. 280561

[51] Int. Cl.³ .......................................... H01M 6/42
[52] U.S. Cl. .................................. 429/159; 429/160; 429/178
[58] Field of Search .............................. 429/146–159, 429/9, 160, 178

[56] References Cited

U.S. PATENT DOCUMENTS

| 3,056,850 | 10/1962 | Rauske et al. ................... | 429/159 X |
| 3,834,945 | 9/1974 | Jensen ............................... | 429/160 X |
| 4,041,216 | 8/1977 | Desplanches et al. .......... | 429/159 X |

*Primary Examiner*—Charles F. LeFevour
*Attorney, Agent, or Firm*—William G. Hopley; Albert E. Koller; James C. Arvantes

[57] ABSTRACT

A battery canister is described which comprises a plurality of electrically conductive trays of polygonal configuration each containing a set of drycell batteries set firmly in position whereby the negative terminals of the batteries are connected in parallel by contact with the base of the tray. The trays are stacked one above the other wherein the positive terminals of one set of batteries are in series contact with the batteries directly above them through pressure contact through the tray. The trays are sealed within a casing and electrically insulated therefrom with the base of the bottom tray being connected to a negative terminal on the casing and the positive terminals of the top tray being connected to a positive terminal on said casing, thereby reducing the number of soldering points required for the canister construction.

5 Claims, 1 Drawing Figure

U.S. Patent
Dec. 16, 1980
4,239,840
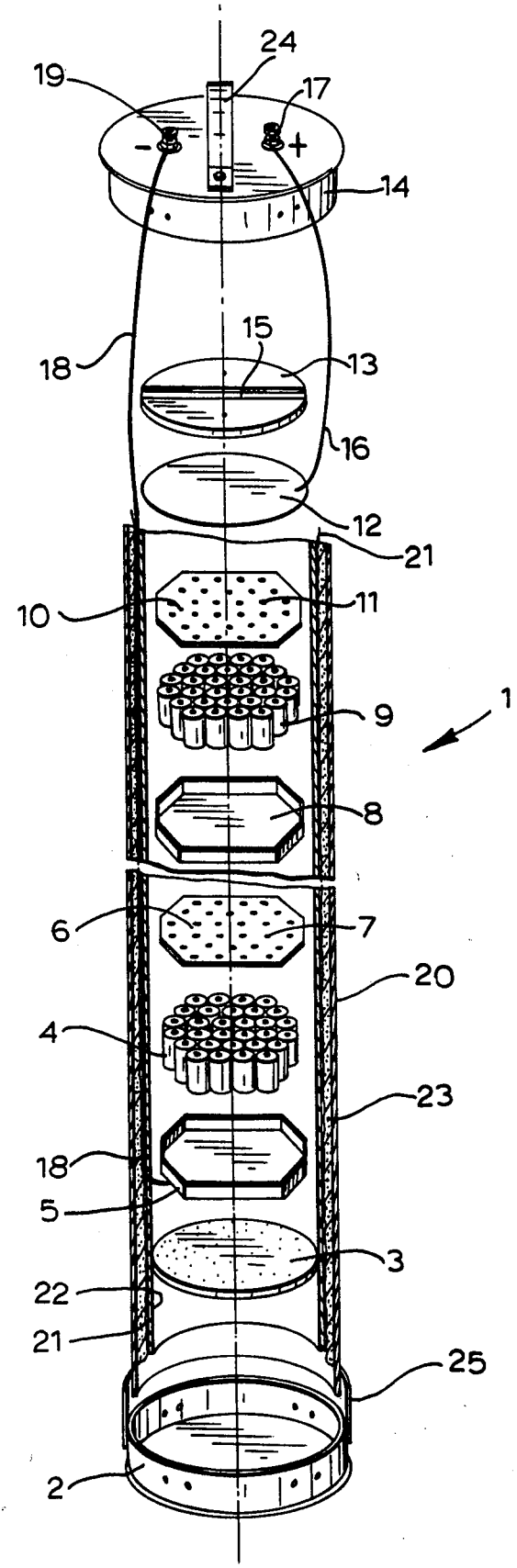

PRESSURE CONTACT CONSTRUCTION FOR DRYCELL BATTERIES

This application is a continuation-in-part of application Ser. No. 902,015 filed May 1, 1978 and now abandoned.

This invention relates to a battery canister containing dry cell batteries in pressure contact. More particularly it relates to a battery canister wherein dry cell batteries are arranged in series or series/parallel arrangement by means of pressure contact to fabricate a canister particularly suitable for use on buoy lights or other navigational aids.

While attempts have been made in the past to produce battery canisters wherein 6 volt and 12 volt dry cell batteries are connected in series or series/parallel arrangement the construction required that the individual dry cells be connected by tinned copper wire or solder links. This made the canister relatively expensive since labour cost in soldering the connections added considerably to the cost of the materials themselves. The applicant has discovered a novel construction for such battery canisters which considerably reduces a number of wire or solder connections and reduces considerably the material costs of the overall canister. The labour cost in constructing the applicant's canister is considerably less than canisters of the prior art used for navigational purposes. Furthermore, the battery canister produced by the applicant is of rugged construction well insulated from atmospheric moisture inherent in navigational systems and because of its particular pressure contact construction substantially reduces the danger of loose contacts which might interrupt power flow when the canister is in service.

It must be appreciated that battery canisters used in navigational aids such as shore lights and river buoys are required to provide steady continuous current for months at a time without supervision. Such battery canisters can be connected into a navigational light in the spring when the lights or buoys are placed in service and are expected to provide uninterrupted service until they are removed from river service shortly before freeze-up. The unique yet rugged construction of the applicant's battery canister provides such dependable service yet is of such a simplified design that it can be manufactured at considerably less cost than battery canisters previously used for this purpose.

It is therefore an object of this invention to provide a battery canister of improved construction.

It is another object of this invention to provide a battery canister containing dry cell batteries in series or series/parallel arrangement wherein the dry cell batteries are maintained in pressure contact within the canister.

The present invention therefore provides a battery canister comprising:

(a) a first set of drycell batteries positioned in a first electrically conductive tray of polygonal configuration and having an upturned edge thereon wherein said batteries are firmly positioned in said tray, the negative terminals of said batteries being connected in parallel by contact with the base of said tray;

(b) a second set of drycell batteries positioned in a second electrically conductive tray of polygonal configuration and having an upturned edge thereon wherein said batteries are firmly positioned in said tray, the negative terminals of said batteries being connected in parallel by contact with the base of said tray;

(c) said second tray being stacked above said first tray wherein the positive terminals of said first set of drycell batteries are connected in parallel by contact with the bottom surface of said second tray, said second tray being aligned with respect to said first tray whereby the positive terminals of said first set of drycell batteries are positioned below the negative terminals of said second set of drycell batteries and connected in series therewith by pressure contact, each of said first tray and second tray being of pliant material to conform to the contour of the contacting terminals of the batteries on the adjacent tray;

(d) each of said first tray and second tray being positioned within a sealed casing and electrically insulated therefrom, the base of said first tray being connected to a negative terminal on said casing and the positive terminals of said second set of drycell batteries being connected to a positive terminal on said casing.

The drawing shows an exploded view in partially schematic form of the internal arrangement within a typical battery canister suitable for navigational aids.

The battery canister construction 1 includes a base cover 2 made of steel or galvanized iron. An insulating disc 3 of wood or other insulating material is placed in the base cover 2 to insulate it from from the electrical connections positioned above. A unit of batteries 4 are placed in tray 5 of polygonal configuration, each with its base positioned downwardly. The tray 5 is of a conductive material so that such positioning of the batteries serves to connect the base or negative terminals of the batteries in parallel. The trays are preferrably made of tin plated steel since this material provides the advantages of conductivity, flexibility for stacking the unit to ensure good electrical contact and low cost and have a rim or upturned edge around the tray for holding the batteries firmly in position. In the preferred embodiment for the construction of a canister suitable for navigational buoys, thirty batteries are fitted into a tray. The individual batteries are the "F" size 1.5 volt type. It must be appreciated however that batteries of other sizes and other combinations of more or less than thirty batteries can be used depending on the total voltage and service desired. An Insulator board 6 is placed on the batteries 4. Board 6 can be of chip-board construction and has holes 7 which are positioned to correspond to the positive terminals of batteries 4 so that the positive terminals pass through insulator board 6 where it is fitted over the batteries. A second battery tray 8 is then placed over insulator board 6 so that all the positive terminals of batteries 4 are connected in parallel due to the electrical conductivity of tray 8.

A broken line is shown in the attached drawing between board 6 and tray 8 to illustrate that the details of construction have been simplified. Only two battery trays are shown for purposes of illustration. In the preferred embodiment of the navigational buoy eight trays are stacked up to form a series/parallel arrangement. The number of such trays of course can vary depending on the total power output desired. A further set of batteries 9 are placed in the tray 8 each with its bottom or negative terminal positioned downwardly. A second insulator board 10 having holes 11 is positioned over the batteries 9 so that their positive terminals project through holes 11. Insulator boards 6 and 10 are an optional feature which serve to permit contact of the positive terminals of the batteries through board holes 7 and 11 with the negative connection or terminal plate positioned above them while at the same time ensuring that the pressure of the stacking arrangement does not cause skirting of the electrical connections. It must be appreciated that for best results, the construction shall provide firm pressure contact to maintain the desired electrical connections but the batteries must be so firmly secured in position that warpage is effectively avoided even when the complete construction is subjected to rough handling. In this respect trays 5 and 8 are designed to snugly hold the batteries in position. As an added precaution, the edges of the batteries can be held together with asphalt or other adhesive but care must be taken to avoid contaminating the battery terminals with such adhesive. Another optional feature to improve the quality of construction is to cover the positive and negative terminals of the batteries with petrolatum to provide excellent electrical connection during pressure contact.

The trays are of polygonal configuration and preferably are a six-sided or eight-sided configuration to provide a tight fitting for the batteries on the tray. By providing a tray of this configuration it is easier to align the batteries in series when the trays are stacked one on top of the other. Since the batteries in each tray are firmly positioned therein, the aligning of the stacked trays ensure that the positive terminal of each of the batteries on the lower tray is in series connection with the battery directly above it. The trays are preferably made of a pliable conductive material such as tin plated steel so that when the trays are stacked and tightly packed within the container the base of the tray will adjust to conform to the contour of the contacting terminals of the batteries on the tray immediately below it.

The positive terminals of batteries 9 which for purposes of illustration are the top layer of batteries is placed in contact with terminal plate 12 which is made of tin plated steel or other conductive material. An insulating disc 13 is positioned over plate 12 to provide electrical insulation between plate 12 and top cover 14. A slot 15 is made across disc 13 to make room for the connections for positive and negative terminals 17 and 19 respectively.

A wire 16 connects positive terminal plate 12 with positive terminal 17. A negative wire 18 connects tray 5 with negative terminal 19. Wires 16 and 18 are connected to plate 12 and tray 5 respectively by soldering or other suitable means. The wires are then connected to their respective terminals in a manner well known in the art. It can thus be seen that the present construction requires only two soldering connections. Previous battery canisters required many more soldering connection in their construction. Such connections add considerably to the labour cost in canister construction.

In constructing the canister, base cover 2 is fitted at the bottom of canister tube 20 and secured by means of poprivets. A plastic bag 21 serves as waterproofing for the batteries should tube 20 be perforated during handling or while in service on a navigational buoy. The insulating disc 3 is placed at the bottom of the bag. Tray 5 containing batteries 4 are placed on top followed by insulator board 6 and further trays of batteries as explained above. An insulator sleeve 22 of card board or chipboard is positioned inside the bag around the battery trays along substantially the entire length of canister tube 20. Sleeve 22 is an optional feature and assists in holding the battery trays in position with respect to each other. During compression of the battery trays within the canister, this sleeve assists in transmitting of compression through the batteries and reduces the chances of having a battery tray wobble out of position. In view of the compression of the battery trays to provide a tight overall construction the individual batteries are subjected to considerable force which may in time result in the collapse of one or more batteries. However in view of the snug positioning of the batteries in each tray and the tight overall construction the remaining batteries will maintain their electrical contact and the current loss due to the collapse of a battery would be minimal.

After tray 5 is inserted down the plastic bag, negative wire 18 connected to tray 5 is run down between the plastic bag and the insulator sleeve 22. Sleeve 22 is perforated at the area of tray 5 to permit the negative wire to pass through. As another optional feature the plastic bag may be taped around the outside at several points to provide a close fit for the bag around the insulator sleeve. The bag containing a stacked battery tray and insulator sleeve is then inserted down the canister tube 20 so that the bottom of the bag sits inside the base cover 2 with insulating disc 3 resting inside the bag but at the bottom of cover 2. Terminal plate 12 is positioned over the positive terminals of batteries 9 which are the top most layer of batteries in the canister. Terminal plate 12 may be secured to insulating disc 13 and form part of top cover 14. The positive wire 16 may then be connected between plate 12 and terminal 17 during construction to the top cover prior to the assembly of the canister. For simplicity only two trays of batteries are shown in the drawing but on the preferred embodiment eight trays would be stacked in the manner. The positive wire 16 is soldered to terminal plate 12 and the positive and negative wires are secured to positive and negative terminals 17 and 19 respectively on top cover 14. The terminals are secured by means well known in the art to provide a liquid tight, vibration-proof, electrically insulated seal. An insulating disc 13 is positioned above the terminal plate 12 to insulate the plate 12 from top cover 14.

Before cover 14 is secured, polyurethane foam is sprayed inside the canister to fill the space between the plastic bag and the canister tube wall. This foam is an optional feature but serves as a shock absorber for batteries in the canister as well as a waterproofing agent. It also serves as a filler and forms such a tight enclosure around the plastic bag and its contents that the chances of the batteries wobbling or splaying during compression is further reduced. Other foams having these properties can also be used.

The mouth of the plastic bag 21 remains open above disc 13 but in view of the tight closure of the top cover 14 and the polyurethane foam insulator, bag closure is not necessary. When the two wires are connected to their respective terminals, the cover 14 is pressed down onto canister tube 20 under pressure to provide tight pressure contact for the batteries. The cover 14 is then secured in place by means of poprivets.

The cover 14 has a handle 24 for picking-up and carrying the canister. In order to provide water tight seals at the closures between the base and top covers and the canister tube 20, a seam adhesive 25 such as a heat shrinkable thermoplastic band is fitted around each of the top and bottom seams when the band is shrink tightened around the seam it provides a water tight and vapour tight seal. Soldering could also be used to provide this seal.

In the preferred embodiment each battery tray contains thirty 1.5 volt batteries connected in parallel. The eight trays in turn are connected in parallel to provide a total of 12 volts for the canister assembly. It was found that such a canister provides a service capacity of at least 350 amp/hr in actual operation in a navigational buoy. While this voltage and current is desirable for the above function, it is apparent that other combination of batteries would be used to obtain other voltage and service outputs. For example, each tray could have two or more layers of batteries in series held on the tray within cylinders. The total series would then be connected in parallel on the tray and then further electrical combination with other such trays can be included within such a cylinder. Another embodiment of the invention could utilize a spring or resilient foam material at the base of the canister, for example, under insulating disc 3 so that the spring action could assist in maintaining the stacked batteries in electrical contact.

I claim:

1. A battery canister comprising:
  (a) a first set of drycell batteries positioned in a first electrically conductive tray of polygonal configuration and having an upturned edge thereon wherein said batteries are firmly positioned in said tray providing a tight fitting for said batteries, the negative terminals of said batteries being connected in parallel by contact with the base of said tray;
  (b) a second set of drycell batteries positioned in a second electrically conductive tray of polygonal configuration and having an upturned edge thereon wherein said batteries are firmly positioned in said tray, the negative terminals of said batteries being connected in parallel by contact with the base of said tray;
  (c) said second tray being stacked above said first tray wherein the positive terminals of said first set of drycell batteries are connected in parallel by contact with the bottom surface of said second tray, said second tray being aligned with respect to said first tray whereby the positive terminals of said first set of drycell batteries are positioned below the negative terminals of said second set of drycell batteries and connected in series therewith by pressure contact providing a tight overall construction, each of said first tray and second tray being of pliant material to conform to the countour of the contacting terminals of the batteries on the adjacent tray;
  (d) each of said first tray and second tray being positioned within a sealed casing and electrically insulated therefrom, the base of said first tray being connected to a negative terminal on said casing and the positive terminals of said second set of drycell batteries being connected to a positive terminal on said casing.

2. A battery canister as claimed in claim 1 comprising
  (a) a module comprising a plurality of electrically conductive trays of polygonal configuration each having a set of drycell batteries positioned therein and each having an upturned edge wherein said batteries are firmly positioned therein;
  (b) said trays in said module being stacked in series wherein the positive terminals of the set of drycell batteries in one of said trays is in pressure contact with the tray above it;
  (c) said module being positioned between said first tray and said second tray and connected in series therewith so that the positive terminals of said first set of drycell batteries are in contact with the lower of said trays stacked in said module and the positive terminals of the set of drycell batteries on the upper of said stacked trays in said module are in contact with the second tray, said second tray, said stacked trays in said module and said first tray being aligned whereby the positive terminal of each of the drycell batteries in one tray are in series connection with the negative terminal of the drycell battery directly above it.

3. A battery canister as claimed in claim 2 wherein said module comprises six electrically conductive trays stacked in series.

4. A battery canister as claimed in claim 3 wherein each of said drycell batteries are F size 1.5 volt type.

5. A battery canister as claimed in claim 4 wherein said trays are electrically insulated from said casing by means of a polyurethane foam layer between said trays and the casing wall.

* * * * *